United States Patent [19]
Nojiri

[11] Patent Number: 5,918,973
[45] Date of Patent: Jul. 6, 1999

[54] HEAD LAMP DEVICE FOR VEHICLE

[75] Inventor: Ryuji Nojiri, Gunma-ken, Japan

[73] Assignee: Fuji Jukogyo Kabushiki Kaisha, Tokyo, Japan

[21] Appl. No.: 08/883,085

[22] Filed: Jun. 26, 1997

[30]  Foreign Application Priority Data

Jul. 23, 1996 [JP] Japan ................................. 8-211875

[51] Int. Cl.⁶ ..................................................... F21V 8/00
[52] U.S. Cl. ........................... 362/511; 362/554; 362/516; 362/322
[58] Field of Search ..................................... 362/552, 554, 362/538, 539, 511, 516, 543, 544, 298, 300, 321; 385/16, 19, 901

[56]  References Cited

U.S. PATENT DOCUMENTS

| | | |
|---|---|---|
| 5,050,048 | 9/1991 | Hendrischk et al. ..................... 362/61 |
| 5,147,128 | 9/1992 | Windross . |
| 5,321,586 | 6/1994 | Hege et al. . |
| 5,422,792 | 6/1995 | Neumann . |
| 5,567,031 | 10/1996 | Davenport et al. ....................... 362/32 |
| 5,707,131 | 1/1998 | Li ............................................... 362/32 |

*Primary Examiner*—Thomas M. Sember
*Attorney, Agent, or Firm*—Smith, Gambrell & Russell LLP; Beveridge, DeGrandi, Weilacher & Young Intellectual Property Group

[57]  ABSTRACT

A head lamp device of a vehicle comprising a passing beam lamp unit, a driving beam lamp unit, and optical fibers connecting them together. A discharge lamp serves as a light source of the passing beam lamp unit. A reflecting mirror disposed ahead of the discharge lamp reflects directly forwardly emitted light from the discharge lamp, and concentrates the light into a condensing portion. The optical fibers guide the light concentrated into the condensing portion to the driving beam lamp unit. The light guided by the optical fibers is used as a light source of the driving beam lamp unit. A shutter mechanism shuts off the light guided by the optical fibers at the time of switching to passing beam, and passes the light guided by the optical fibers at the time of switching to driving beam. The head lamp device using a discharge lamp as a light source completely eliminates the disadvantage of a discharge lamp type head lamp, a very high cost. It also equalizes the color temperatures of the passing beam and the driving beam, and improves the balance of luminous intensity distribution, and forward visibility.

10 Claims, 3 Drawing Sheets

HEAD LAMP DEVICE FOR VEHICLE

BACKGROUND OF THE INVENTION

1. Field of the Invention

The present invention relates to a head lamp device for a vehicle.

2. Description of the Related Art

A head lamp for a vehicle generally comprises a reflector in the shape a paraboloid of revolution provided on the inner surface of a rear wall of a lamp housing; a light bulb provided near the focus of the reflector; and a light source front lens covering a front opening of the lamp housing. Light from the light source is reflected by the reflector to form beams nearly parallel to the optical axis. These beams are diffused by the front lens to illuminate the road ahead with a predetermined luminous intensity distribution pattern (e.g., Japanese Laid-Open Patent Publication No. 2-12702).

The head lamp of a vehicle has usually two states, i.e., a driving beam for forward and upward illumination, and a passing beam for forward and downward illumination. The driving beam is; used when the vehicle runs on the road without any cars running on the opposite lane. Whereas the passing beam is used either while a car is running on the opposite lane, or during a drive in a bright urban district. According to the Safety Standard, the driving beam and the passing beam are required to provide a predetermined visible range, respectively. Further, the head lamp should permit light to be dimmed, or the axis of projected light to be directed obliquely downward, so as not to interfere with driving of other vehicles.

The head lamp in customary use is broadly classified into a two-lamp system having a right lamp unit and a left lamp unit on the front of the vehicle, and a four-lamp system having two right lamp units and two left lamp units on the front of the vehicle. With the two-lamp system, one lamp unit contains a light bulb which provides both a filament for driving beam and a filament for passing beam. With a certain type of the four lamp system, a driving beam lamp unit having a light bulb which provides a single filament for driving beam and a passing beam lamp unit having a light bulb which provides a single filament for passing beam are provided in pairs, and the two pairs are mounted on both sides of the front of the vehicle. In both of the above, only the filament for passing beam is lit when projecting the passing beam, while the filaments for passing beam and driving beam are both lit to project the driving beam.

In recent years, a discharge lamp has been utilized as a light source of a head lamp. Compared with a conventional filament type lamp, the discharge lamp radiates light of high luminance with markedly reduced electric power and remarkably long life. Thus, it is highly effective for improving the forward visibility and for energy saving.

However the discharge lamps need to be supplied with relatively high voltage of electricity, and therefore a lighting circuit for raising the voltage of electricity to be supplied to the discharge lamps is required, and it is difficult for the lighting circuit to be shared by a plurality of discharge lamps. Hence, a total of four lighting circuits (two on each side of the vehicle) are needed, costing very high.

To make up for this disadvantage, an idea has been to use a discharge lamp as a light source on the passing beam side, and use a conventional inexpensive light source, such as a halogen lamp, for the driving beam side. With such a system, the discharge lamp and the conventional light source are different in color temperature when lit. Light from the driving beam side looks relatively dimmer than light from the passing beam side. The luminous intensity distribution is also ill-balanced between the driving beam side and the passing beam side.

SUMMARY OF THE INVENTION

The present invention aims to deal with the foregoing subject.

This invention provides a head lamp device of a vehicle having a first beam lamp unit and a second beam lamp unit arranged with the former above the latter or arranged side by side, which comprises a first light source of the first beam lamp unit; a reflecting mirror disposed ahead of the first light source to reflect harmful, directly forward emitted light from the light source and to concentrate the light into a condensing portion provided in the first beam lamp unit; and optical means for guiding light, concentrated into the condensing portion, to the second beam lamp unit for use as a second light source of the second beam lamp unit. The head lamp device, even in case of the four-lamp type, involves one light source and one lamp lighting circuit on either side of the vehicle. Thus, it can resolve the disadvantage of a discharge lamp type head lamp, that is, a high cost. Furthermore, the first beam and the second beam are equal in color temperature. This can improve the balance in luminous intensity distribution, forward visibility, and appearance properties. Besides, light emitted directly from the light source is called a glaring light and is not preferred to be used for illuminating the road ahead of the vehicle. Then this glare conventionally is cut off by shade and discarded. However, this glaring light to be cut off is utilized as the light source for the driving beam lamp unit. Consequently, the utilization rate of light from the light source can be markedly improved. This is very effective as an energy saving measure.

The head lamp device of the present invention also include a shutter mechanism for shutting off the light guided by the optical means to the second beam lamp unit. In the case of passing beam, the shutter mechanism is closed to shut off the light, and only the first beam lamp unit illuminates the road ahead. When switched to the second beam, a switching signal opens the shutter mechanism to pass the light, whereupon the lamp units on the first beam side and the second beam side illuminate the road ahead. Hence, switching between the first beam and the second beam is easy.

DESCRIPTION OF THE PREFERRED EMBODIMENTS

Preferred embodiments of the present invention will be understood from the following detailed description referring to the accompanying drawings.

Figure 1:
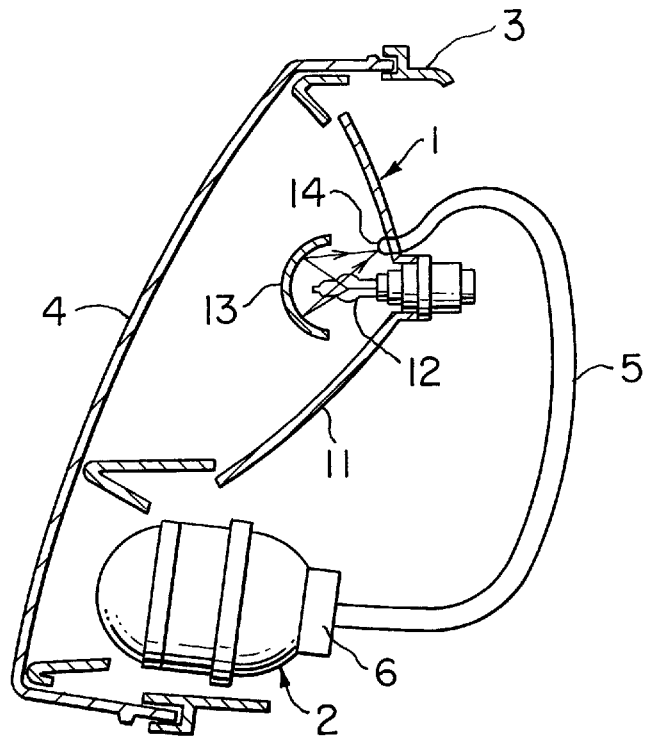
FIG. 1 shows a vertical sectional view of a head lamp device according to an embodiment of the present invention.

In FIG. 1, reference numeral 1 designates a passing beam lamp unit illuminating in a forward and downward direction, and reference numeral 2, a driving beam lamp unit illuminating in a forward and upward direction. The passing beam and driving beam lamp units 1 and 2 are arranged side by side in a single lamp housing 3 as a pair. Two pairs are mounted on the right and left sides of the front of a vehicle, respectively. An opening formed on the front surface of the lamp housing 3 is fitted with a front lens 4 formed in one piece from the passing beam side to the driving beam side. The front lens 4 may be divided into two components, which may be provided on the passing beam side and the driving beam side, respectively.

The passing beam lamp unit 1 comprises a reflector 11 in the shape of a paraboloid of revolution, a discharge lamp 12 provided near the focus of the reflector 11, and a reflecting mirror 13 disposed ahead of the center of the discharge lamp 12 and having a concave surface thereof facing backward. Light from the discharge lamp 12 is reflected by the reflector 11. After passing through the front lens 4, the light illuminates forward in a desired pattern of luminous intensity distribution. A part of the light emitted forward directly from the discharge lamp 12 is reflected by the reflecting mirror 13 in front of the discharge lamp, and concentrated into a condensing portion 14 on the reflector 11.

The condensing portion 14 is provided either at a position adjacent the center of the reflector 11, or at a position on a peripheral wall, if this is provided, on the outer periphery of the reflector 11. Namely, the condensing portion 14 is provided in a non-effective part of the reflector 11 which does not affect the essential function of the reflector to form a desired forward illuminating light beam. The reflecting mirror 13 is composed of a concave mirror with a complex ellipsoidal reflecting surface. The surface reflects the part of light emitted forward directly from the discharge lamp 12 (i.e., glaring light) to concentrate it into the condensing portion 14. The condensing portion 14 is composed of a lens. The light gathered there is guided by optical fibers 5 to the driving beam lamp unit 2 to serve as a light source of the driving beam lamp unit 2.

Figure 2:
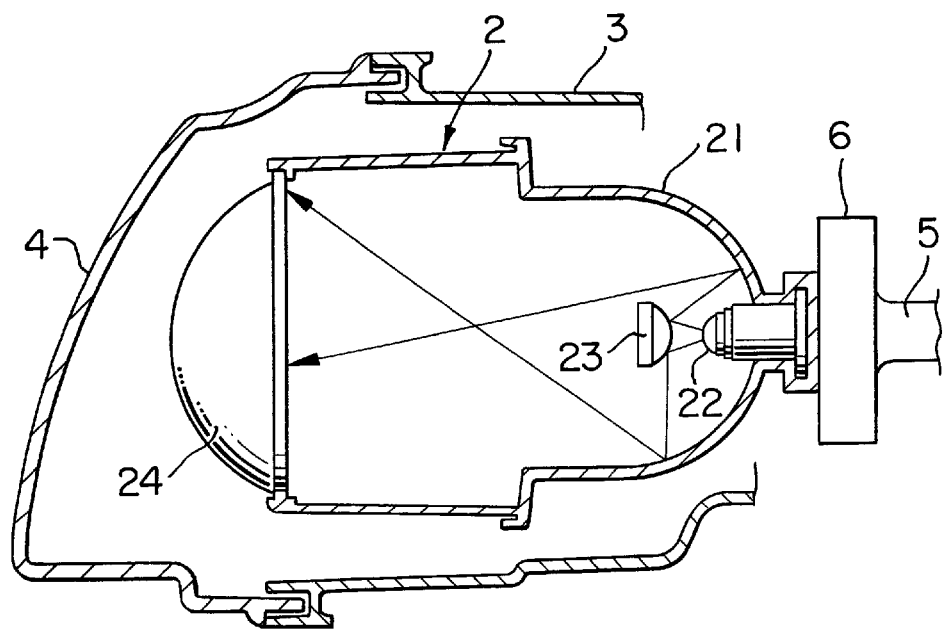
FIG. 2 is a sectional view showing detailed configuration of a driving beam lamp unit used in the present invention.

The driving beam lamp unit 2 comprises, as shown in FIG. 2, a complex ellipsoidal half-inclined reflector 21, a projecting portion 22 provided at the center of the reflector 21 and at the optical exit of the optical fibers 5, a reflecting mirror 23 composed of a convex mirror disposed ahead of the projecting portion 22 and facing backward, and a convex lens 24 located forward of the mirror. Light guided by the optical fibers 5 and projected from the projecting portion 22 is reflected in a scattered manner by the reflecting mirror 23. The light reflected by the reflecting mirror 23 is further reflected by the reflector 21 to pass through the forward convex lens 24. Because of this passage, the reflected rays become a beam nearly parallel to the optical axis. After passing through the front lens 4, the beam illuminates the road ahead in a desired luminous intensity distribution pattern.

The above FIG. 2 shows an example in which a known projector type lamp unit is used as the driving beam lamp unit 2, and the light source of the projector type lamp unit incorporates the projecting portion 22 at the exit of the optical fibers 5 and the reflecting mirror 23. However, the driving beam lamp unit 2 is not restricted to that projector type, but may be any known lamp unit. The light source for it may be of any structure incorporating the projecting portion 22 at the exit of the optical fibers 5 and the reflecting mirror 23.

A shutter mechanism 6 is provided close to the exit of the optical fibers 5 connecting the condensing portion 14 with the projecting portion 22 of the driving beam lamp unit 2. The shutter mechanism 6 controls optical projection from the projecting portion 22 in an on-off manner.

Figure 3:
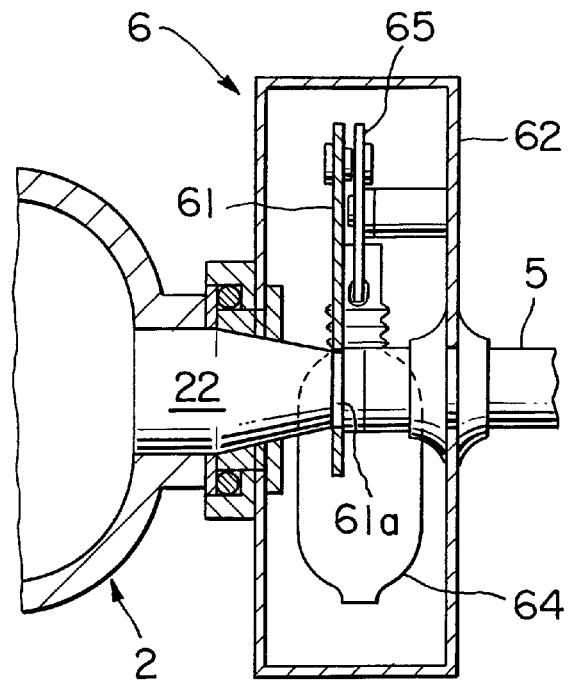
FIG. 3 is a sectional view of a shutter mechanism.
Figure 4:
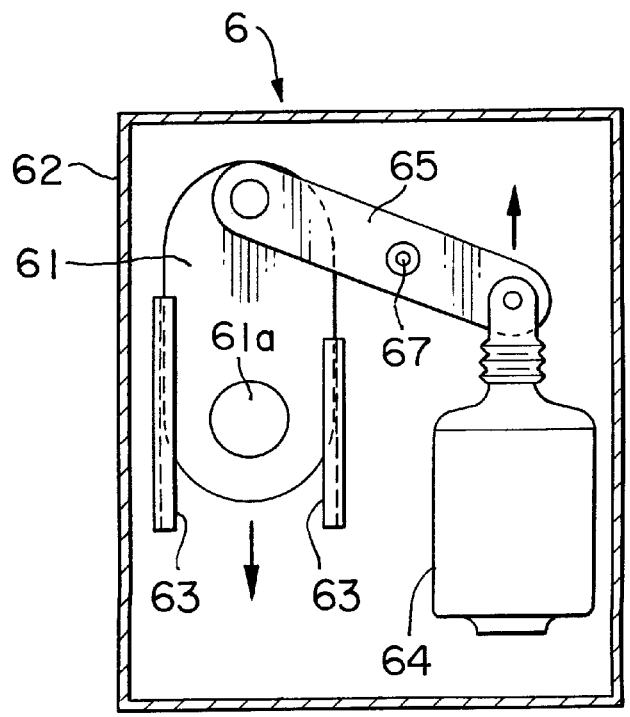
FIG. 4 is a front view, partly in section, of the shutter mechanism.

In detail, the shutter mechanism 6, as shown in FIGS. 3 and 4, comprises a shutter 61 slidably supported by guides 63 fixedly provided in a case 62, and an actuator 64 for moving the shutter 61 slidingly. When the actuator 64 is operated, the shutter 61 slides via a lever 65 pivoted at 67. As a result, the shutter 61 is switched between two states, i.e., a state in which an opening 61a of the shutter 61 aligns with the exit of the optical fibers 5 to pass light, and a state in which the shutter 61 closes the exit of the optical fibers 5.

The structure of the shutter mechanism is not restricted to the above-described example. For example, the shutter 61 may be turned. Any other structure may be employed which permits switching between the passage of light, and the blockage of light, by the operation of the actuator.

The actuator 64 is a device to be electrically actuated by a switching signal for the passing beam and the driving beam, such as a solenoid device or an electric motor.

Figure 5:
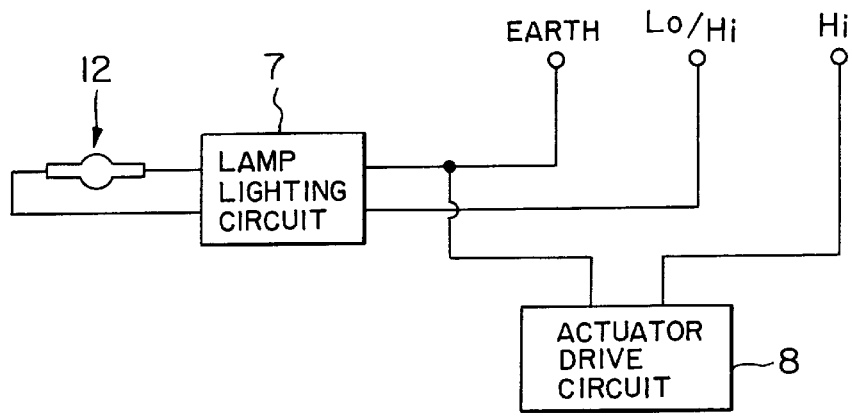
FIG. 5 is a circuit diagram showing an outline of an example of a control circuit for the head lamp device in the present invention.

FIG. 5 shows an example of an electric circuit for the head lamp device illustrated in FIGS. 1 to 4. When a lighting switch is turned on, a discharge lamp 12 is energized through a lamp lighting circuit 7 to be lit. In response to an on-off signal from the lighting switch and a switching signal for the passing beam and the driving beam, an actuator drive circuit 8 is actuated. Thus, the actuator 64 is operated to move the shutter 61.

Figure 6:
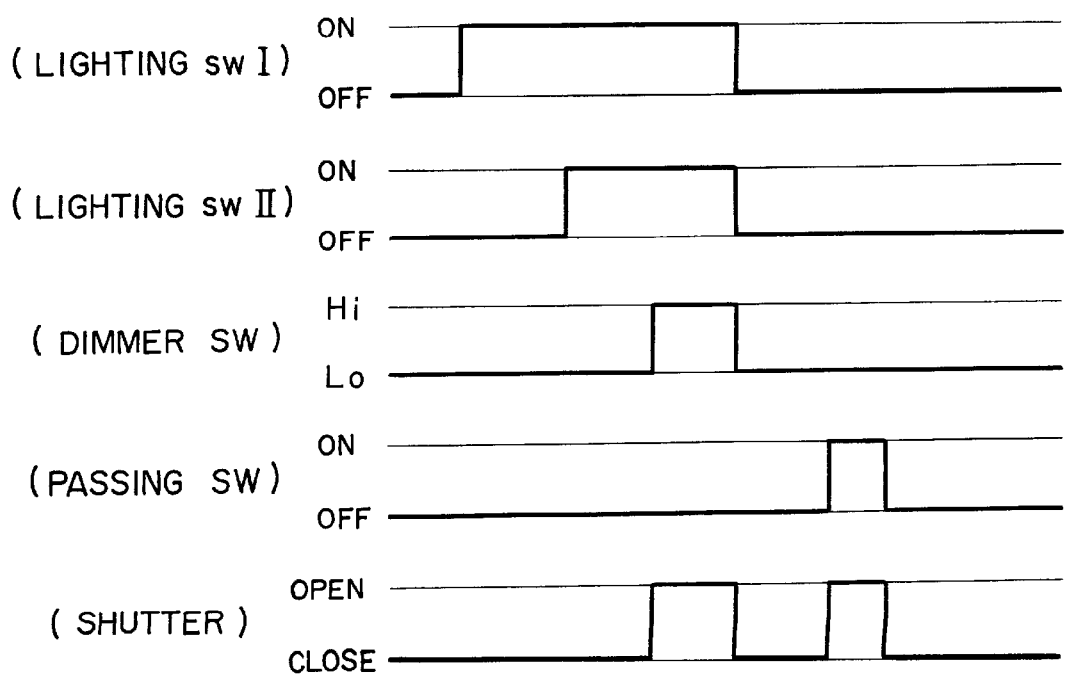
FIG. 6 is a time chart for illustrating the mode of action of the head lamp device shown in FIG. 1.

FIG. 6 is a time chart showing the relationship among a lighting switch, a dimmer switch and the opening/closing action of the shutter mechanism 6 of the head lamp device in a vehicle. In this vehicle, when the first stage of the lighting switch is turned on, the lamps necessary for a night drive, except the head lamps, are lit. When the second stage of the lighting switch is turned on, the head lamps are switched on in addition to those lamps. Switching between the passing beam and the driving beam of the head lamp is performed by means of the dimmer switch. The action of the head lamp device illustrated in FIGS. 1 to 4 will be described with reference to FIGS. 5 and 6.

When the first stage I of the lighting switch is turned on, the lamps for the night, excluding the head lamps, are lit as mentioned above. At this time, the dimmer switch is on the passing beam side (Lo), and the shutter 61 is closed (CLOSE).

Then, when the second stage II of the lighting switch is turned on, the discharge lamp 12 is lit, and the passing beam lamp unit 1 becomes active (a forward illuminating state). On this occasion, the dimmer switch is on the passing beam side (Lo). Thus, light coming from the condensing portion 14 to the projecting portion 22 through the optical fibers 5 is blocked by the shutter 61. The driving beam lamp unit 2 become inactive, and the head lamps allow the use of the passing beam.

From this state of use of the passing beam, the dimmer switch is switched to the driving beam side, Hi. Responsive to this Hi-switching signal, the actuator drive circuit 8 operates the actuator 64 to open the shutter 61 (OPEN). Thus, the light guided through the condensing portion 14, the reflecting mirror 13 and the optical fibers 5 is passed through the shutter 61, and projected from the projecting portion 22 into the driving beam lamp unit 2. This makes the driving beam lamp unit 2 active (a forward illuminating state), producing a state of driving beam use in which both the passing beam lamp unit 1 and the driving beam lamp unit 2 illuminate forward.

In the state of nonuse of the head lamps with the dimmer switch in Lo and the lighting switch in OFF, the shutter 61 is held in the closed state. When a passing switch is turned on in this state, an ON-signal from the passing switch actuates the actuator drive circuit 8. As a result, the actuator 64 is operated, and the shutter 61 in the closed state is switched to the open state. Consequently, the head lamps are lit in a driving beam condition.

Generally, light emitted directly from the light source is called a glaring light and is not preferred to be used for illuminating the road ahead of the vehicle. Therefore, a shade locate just in front of the light source is commonly provided to cut off the light emitted directly from the light source.

The present invention utilizes the directly forward illuminating light (glaring light) from the light source that has to be cut off as described above. That is, the reflecting mirror 13 composed of a concave mirror with a complex ellipsoidal reflecting surface is disposed ahead of the discharge lamp 12, instead of a ray-cutting shade, in the passing beam lamp unit 1. The reflecting mirror 13 functions dually, to cut off the directly forward illuminating rays from the discharge lamp 12, and to concentrate these directly forward illuminating rays into the condensing portion 14. The light concentrated into the condensing portion 14 is guided by the optical fibers 5 to the driving beam lamp unit 2, and used as a light source of the driving beam lamp unit 2.

The foregoing structure makes a single lamp serve as a light source for the passing beam and the driving beam. Even when a four-lamp system is used, therefore, only two lighting circuits are required for the discharge lamps. This completely eliminates the disadvantage of a discharge lamp type head lamp, a very high cost. Furthermore, the color temperatures of the passing beam and the driving beam are equalized, and improvements can be achieved in the balance of luminous intensity distribution, and appearance properties.

With the existing head lamp, moreover, the directly forward illuminating light from the light source of passing beam has been cut off by a shade. Thus, the utilization rate of light emitted by the light source has been as much as about 40%. With the head lamp of the present invention, on the other hand, the directly forward illuminating light to be cut off as described above is used as a light source of the driving beam lamp unit. Hence, the utilization rate of light emitted by the light source is about 80% or more.

With the present invention, moreover, switching between the passing beam and the driving beam is performed by the action of the shutter mechanism 6 that controls the passage and blockage of light guided by the optical fibers 5 to the driving beam lamp unit 2. Thus, a single light source (discharge lamp) can form both the passing beam and the driving beam.

According to the present invention, as described above, a single light source (discharge lamp) can serve as a light source for both the passing beam and the driving beam. This eliminates the disadvantage of a discharge lamp type head lamp, a high cost. In addition, switching between the passing beam and the driving beam can be performed easily. Furthermore, the utilization rate of light emitted by the discharge lamp can be markedly improved. Hence, the advantages of a head lamp using a discharge lamp, saving in energy and a long life, can be further improved. As noted from this, the head lamp device of the present invention can produce remarkable effects in practical use.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A head lamp device for a vehicle having a passing beam unit for illumination in a forward and downward direction and a driving beam unit for illumination in a forward and upward direction, said passing and driving beam units being contained in a lamp housing mountable on a vehicle and covered by a lens, comprising:

a lamp provided in said passing beam unit;

a reflector behind said lens to direct light in a forward direction;

a reflector mirror disposed between said lamp and said lens;

a light condensing portion on said reflector, said reflecting mirror being shaped to reflect part of the light emitted from said lamp into said light condensing portion;

an optical conductor connecting said light condensing portion to said driving beam unit to conduct light from said light condensing portion to said driving beam unit, said light conducted to said driving beam being used as a light source for the driving beam unit; and a shutter provided between said optical conductor and said driving beam unit for shutting on and off said driving beam unit.

2. The head lamp device according to claim 1, wherein a driving beam is provided by said passing beam unit and said driving beam unit.

3. The head lamp device according to claim 1, wherein said passing beam unit is on and the driving beam unit is off.

4. The head lamp device according to claim 1, wherein an actuator is provided for moving said shutter between open and closed positions.

5. The head lamp device according to claim 4, further comprising:

a selector switch for supplying a switching signal for passing beam or driving beam selection, said selector switch being electrically connected to said actuator.

6. The head lamp device according to claim 1, wherein an optical conductor is an optical fiber.

7. The head lamp device according to claim 1, wherein said light condensing portion is provided in a part of said reflector of said passing beam unit which is located behind the reflecting mirror.

8. The head lamp device according to claim 1, wherein said reflecting mirror is a concave mirror with a concave surface facing said lamp.

9. The head lamp device according to claim 1, wherein said driving beam unit has a light projecting portion connected to said optical conductor and a reflecting mirror facing said projecting portion.

10. The head lamp device according to claim 1, wherein said lamp is a discharge lamp.

* * * * *